(No Model.)  7 Sheets—Sheet 1.

L. J. HIRT.
NAIL MACHINE.

No. 355,609.  Patented Jan. 4, 1887.

Witnesses
H. G. Phillips.
A. Sorge Jr.

Inventor
Louis J. Hirt,
By his Attorney
Geo. B. Selden (No Model.)
7 Sheets—Sheet 2.

L. J. HIRT.
NAIL MACHINE.

No. 355,609. Patented Jan. 4, 1887.

Witnesses
H. G. Phillips.
A. Sorge Jr.

Inventor
Louis J. Hirt
By his Attorney
Geo. B. Selden.

(No Model.)

L. J. HIRT.
NAIL MACHINE.

7 Sheets—Sheet 4.

No. 355,609.

Patented Jan. 4, 1887.

Witnesses
H. G. Phillips.
A. Sorge Jr.

Inventor
Louis J. Hirt,
By his Attorney
Geo. B. Selden.

(No Model.)  
7 Sheets—Sheet 5.

L. J. HIRT.
NAIL MACHINE.

No. 355,609. Patented Jan. 4, 1887.

Witnesses  
H. G. Phillips.  
A. Sorge Jr.

Inventor  
Louis J. Hirt,  
By his Attorney  
Geo. B. Selden (No Model.)  L. J. HIRT.  7 Sheets—Sheet 6.
NAIL MACHINE.
No. 355,609.  Patented Jan. 4, 1887.
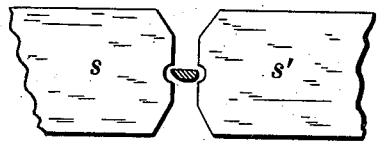
   
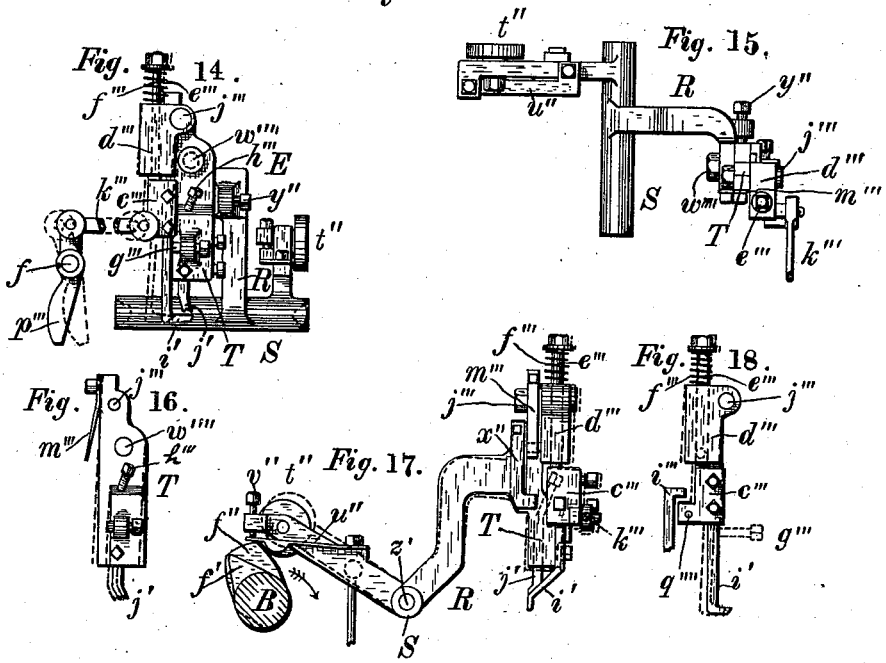
Witnesses
H. G. Phillips.
A. Sorge Jr.
Inventor
Louis J. Hirt,
By his Attorney
Geo. B. Selden (No Model.) 7 Sheets—Sheet 7.
L. J. HIRT.
NAIL MACHINE.
No. 355,609. Patented Jan. 4, 1887.
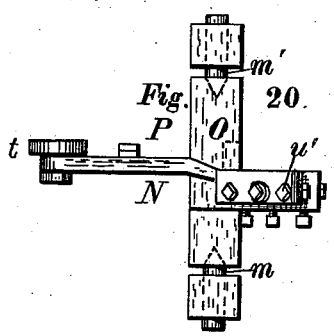
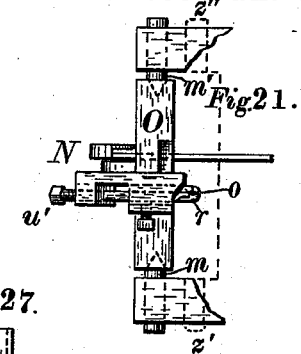
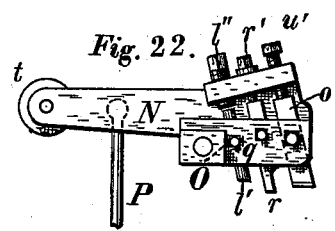
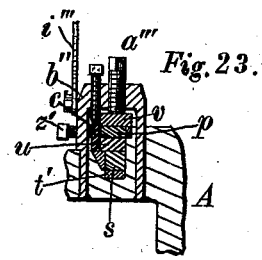
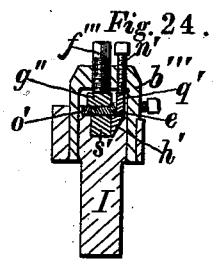
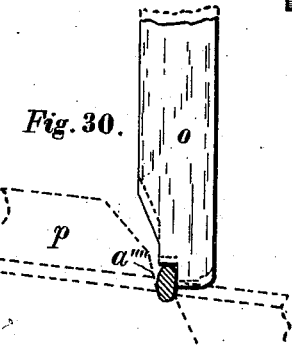
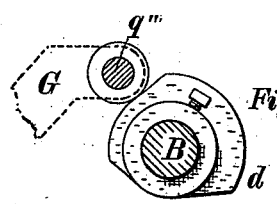
Witnesses
H. G. Phillips
G. Sorge Jr.
Inventor
Louis J. Hirt
By his Attorney
Geo. B. Selden

UNITED STATES PATENT OFFICE.

LOUIS J. HIRT, OF ROCHESTER, NEW YORK, ASSIGNOR TO THE STANDARD NAIL AND TACK COMPANY, OF SACO, MAINE.

NAIL-MACHINE.

SPECIFICATION forming part of Letters Patent No. 355,609, dated January 4, 1887.

Application filed July 9, 1886. Serial No. 207,754. (No model.)

*To all whom it may concern:*

Be it known that I, LOUIS J. HIRT, a citizen of the Republic of France, residing at Rochester, in the county of Monroe and State of New York, have invented certain Improvements in Machines for Making Nails, of which the following is a specification, reference being had to the accompanying drawings.

My present invention relates to certain improvements on the nail-machine patented to me in Letters Patent No. 341,658, dated May 11, 1886, having for their principal object the simplification of the apparatus described in the said patent, but some of which improvements are capable of being used in other relations.

My improvements are fully described and illustrated in the following specification and accompanying drawings, and the novel features thereof specified in the claims annexed to the said specification.

Figure 1:
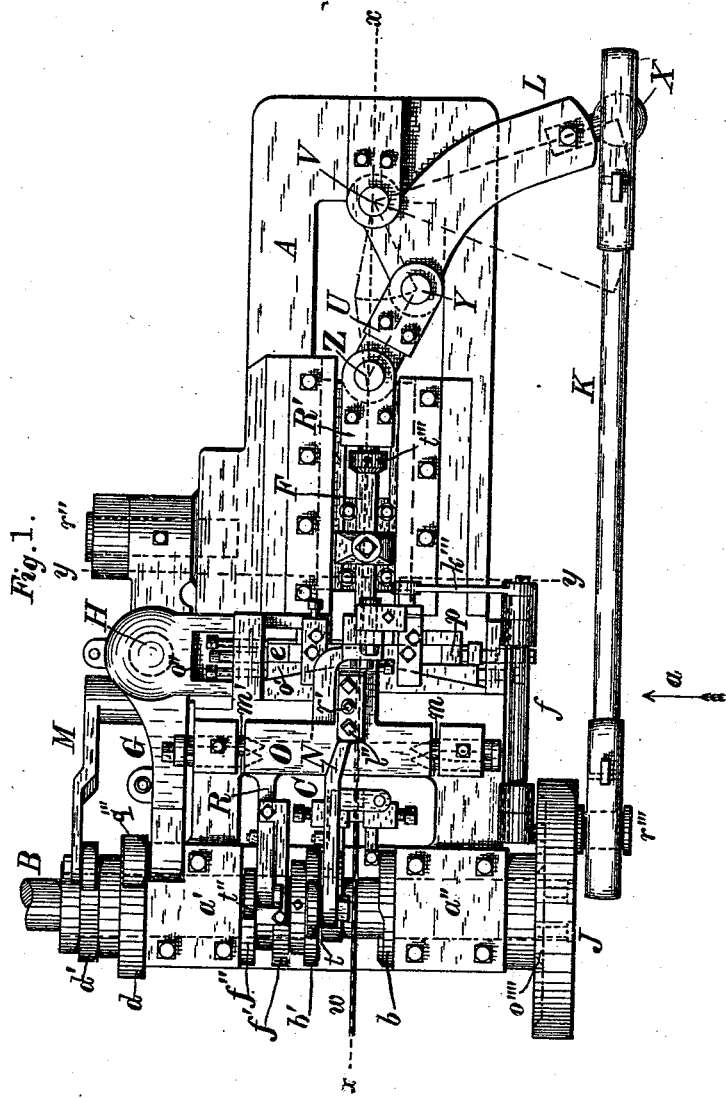
Figure 2:
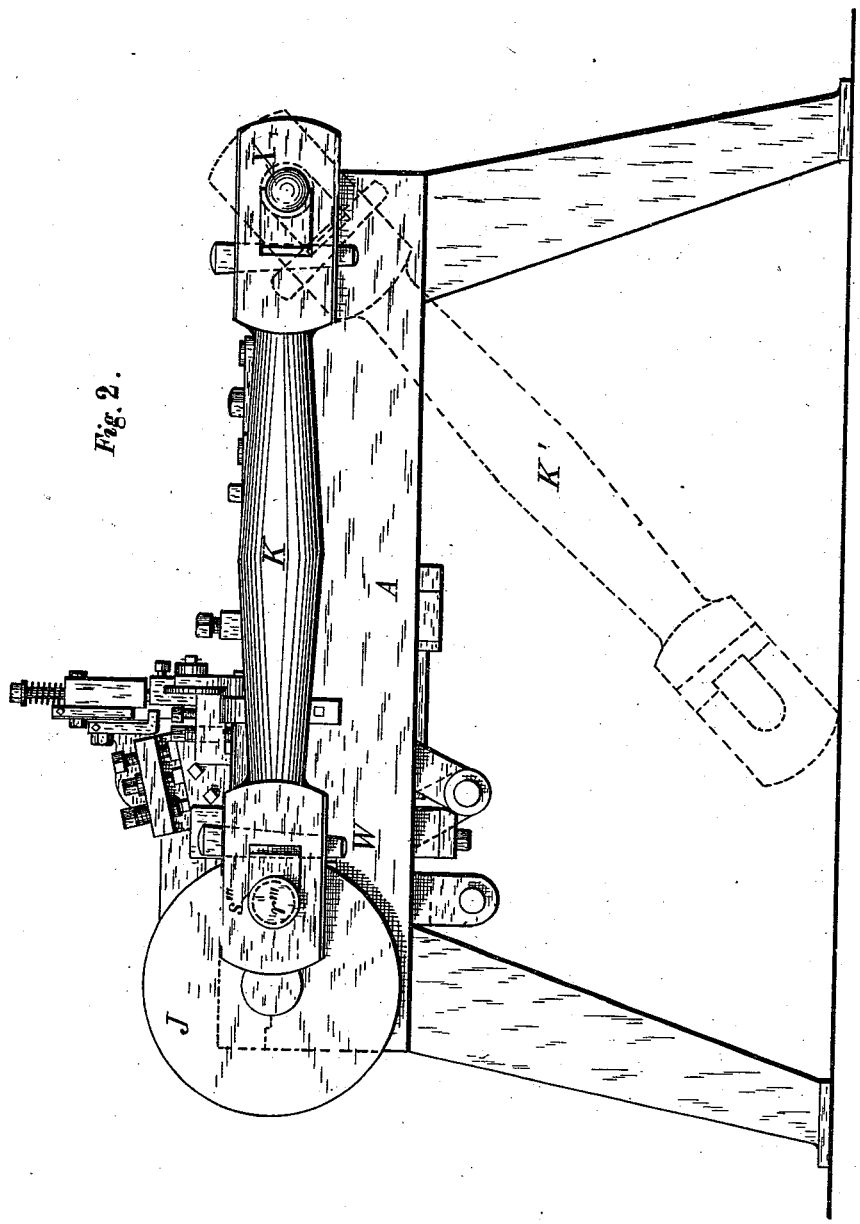
Figure 3:
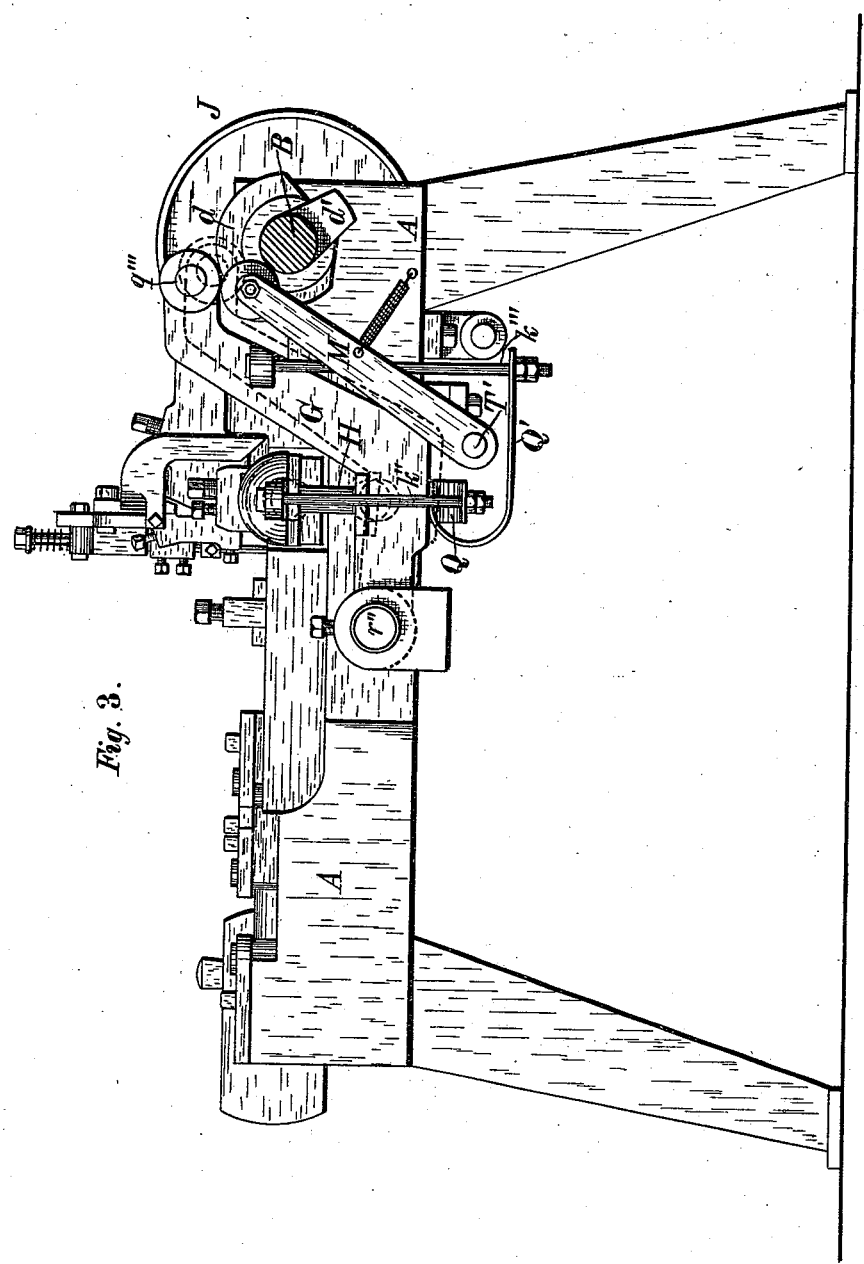
Figure 4:
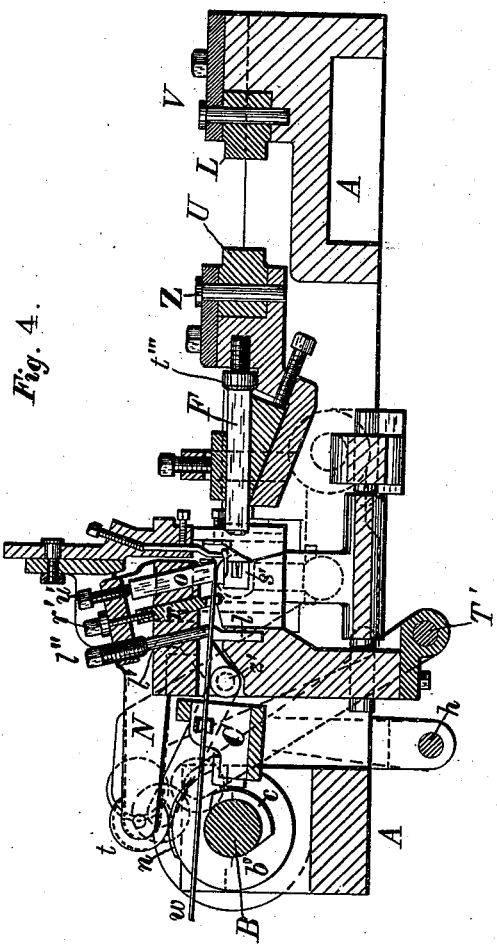
Figure 5:
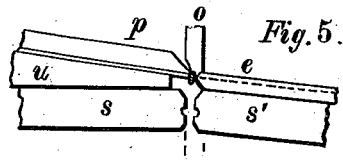
Figure 6:
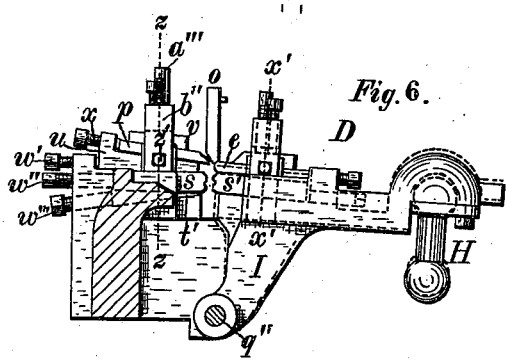
Figure 7:
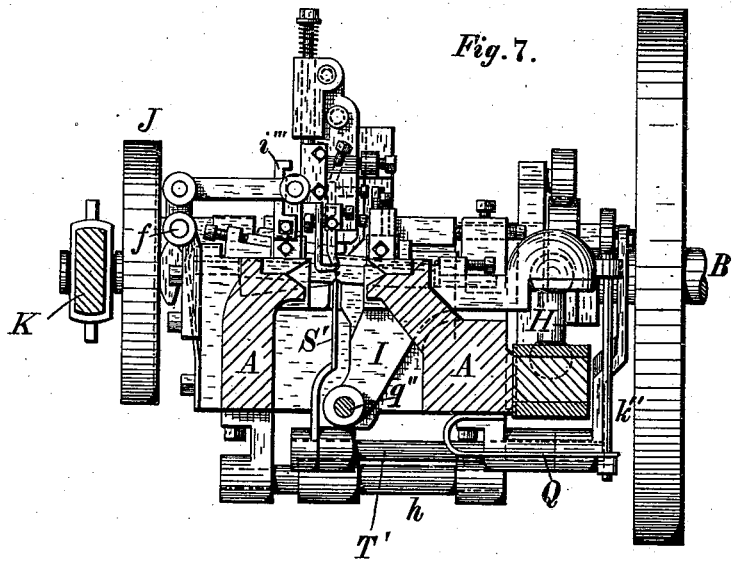

In the accompanying drawings, representing my present improvements in nail-machines, Figure 1 is a plan view. Fig. 2 is a side elevation. Fig. 3 is a side elevation showing the side of the machine opposite to that shown in Fig. 2. Fig. 4 is a central longitudinal section on the line $x\,x$, Fig. 1. Fig. 5 is an elevation of the cutters, gripping-dies, and wire-holding block. Fig. 6 represents the cutting and gripping mechanism detached, in elevation, as seen from the right hand in Fig. 1. Fig. 7 is a transverse section of the machine on the line $y\,y$, Fig. 1, showing the parts to the left hand of the said line, the slide of the heading-die being omitted. Fig. 8 is an enlarged view of the gripping-dies, showing the blank in section as inserted in the dies before they are closed on it. Fig. 9 represents the wire, and shows the lines on which it is divided into blanks. Fig. 10 is a section of the flattened wire. Figs. 11 and 12 represent the blanks as cut from the wire as seen from different positions. Fig. 13 represents the blank as made from flattened wire. Fig. 14 represents the blank-carrier in elevation. Fig. 15 is a plan view of the blank-carrier. Fig. 16 represents the upper blank-carrying finger, and the pivoted block to which it is attached, in elevation, detached. Fig. 17 is a side elevation of the blank-carrying mechanism as seen from the direction indicated by the arrow $a$ in Fig. 1. Fig. 18 represents the lower blank-carrying finger and the pivoted block which sustains it. Fig. 19 represents various forms of the finished nails produced by my present invention. Fig. 20 is a plan view of the pivoted lever which carries the wire-supporting block. Fig. 21 is an elevation of the same as seen from the right hand in Fig. 20. Fig. 22 is an elevation of the same, detached. Fig. 23 is a section on the line $z\,z$, Fig. 6. Fig. 24 is a section on the line $x'\,x'$, Fig. 6. Fig. 25 is a front view of the cutter. Fig. 26 is a side view of the same. Fig. 27 represents the wire-guide detached. Fig. 28 is a side view of the cutting-block. Fig. 29 is an end view of the same. Fig. 30 represents the wire-supporting block and the cutting-block on an enlarged scale. Fig. 31 represents the cam which operates the cutter and gripper.

A nail-machine embodying my present improvements consists, essentially, of a supporting-frame, A, main driving-shaft B, feeding mechanism C, blank cutting and gripping mechanism D, Fig. 6, blank-carrying mechanism E, Fig. 14, and the reciprocating heading-die F, Fig. 4.

In the operation of the machine the wire $w$ is fed to the cutters by the feeding mechanism, the construction of which is like that described in my former Patent No. 341,658, and is divided by the cutters into blanks of substantially the forms shown in Figs. 11, 12, and 13, the blank then having its head bent over, as described in the said patent, and being afterward subjected to the action of the heading-die while held in suitable grippers, to which it has been transferred by the carrying-fingers.

The forms of the finished nails produced by my present machine are represented in Fig. 19.

The main driving-shaft B is supported in the journal-boxes $a'\,a''$ on one end of the frame A, being arranged to revolve therein and to transmit motion to the various operative parts of the machine. Thus the feeding mechanism C is actuated by the cams or flanges $b\,b'$, Fig. 1, and the cam $c$, Fig. 4, in a manner substantially similar to that shown in my former patent. The cutter $e$, Fig. 6, is actuated from the cam $d$ by the lever G, Figs. 1 and 3, ball-headed connection H, and pivoted arm I, Fig.

6. The blank-carrying mechanism is operated by the cam $f'''$, Figs. 1 and 17, on the shaft B, the lower finger or blank-carrier, $i'$, being moved by the rock-shaft $f$, Figs. 1 and 7, to which motion is imparted by the cam $o''''$ on the crank-disk J, and the heading-die F is reciprocated from a pin, $r'''$, on the crank-disk J, by means of the connection K and pivoted lever L. The lever M which operates the clearer or discharger also receives motion from the cam $d'$ on the main driving-shaft B. It will be observed that by this construction and arrangement of the parts I am enabled to simplify the machine materially, and to operate all its mechanism from a single driving-shaft.

The position and arrangement of the feeding mechanism C are indicated in the sectional view, Fig. 4, this mechanism being pivoted at $h$ and arranged to reciprocate between the shaft B and the frame of the machine, receiving its feeding motion from the cam $c$ on the shaft B, and its return movement from a suitable spring. The feeding-jaws are operated by the cams or flanges $b\ b'$, Fig. 1, in a manner substantially similar to that described in my former patent.

From the feeding mechanism the wire is fed inward into the machine, passing first between the holding-jaws $l\ l'$, Fig. 4, by which the wire is held or gripped at the time the cutter $e$ is severing the blank, so as to prevent the wire from twisting. The lower jaw, $l$, is inserted in the frame of the machine, while the upper jaw, $l'$, is inserted in the lever N, which is pivoted on the centers $m\ m'$, Fig. 1, and receives a rocking motion from the cam $n$, Fig. 4, on the edge of the flange $b'$, and carries at its inner end the wire-supporting block $o$, which, in connection with the cutting-block $p$, grips and holds the wire in place during the cutting operation. The upper jaw, $l'$, is made adjustable in the lever N by means of a set-screw, $q$, Fig. 22, and an adjusting-screw, $l''$, to vary the amount of pressure on the wire, or to adjust the machine to suit different sizes of wire. The lower jaw, $l$, may also be made adjustable in the frame of the machine. As will be observed from Fig. 4, the adjusting-screw $l''$ is made sufficiently large to permit the removal of the jaw $l'$ through the opening occupied by the screw. After passing between the jaws $l\ l'$ the wire passes through an opening in the lower end of the guide $r$, Fig. 4, which is made adjustable in the lever N by means of the screw $r'$. The wire-guide $r$ holds the wire constantly in contact with the supporting-block $o$, and the length of the point of the blank may be varied by the adjustment given to the wire-guide $r$. The lever N carries at its outer end the roller $t$, and a spring is attached to the lever and the frame, so as to draw the lever downward to keep the roller in contact with the cam $n$ and the edge of the flange $b'$. The lever N is provided with a central transverse bar, O, into the ends of which the centers $m\ m'$ are fitted. The centers $m\ m'$ pass through suitable lugs on the frame of the machine. The form and arrangement of the lever N will be understood from an inspection of the detached views, Figs. 20, 21, and 22. The rod to which the spring which draws the lever downward is attached is indicated at P. A set-screw, $u'$, Figs. 21 and 22, serves to adjust the wire-supporting block $o$. As indicated in these figures, the inner end of the lever is given a suitable shape adapted to receive and hold the jaw $l'$, the wire-guide $r$, and the supporting-block $o$ and the set-screws by which they are held in place, and the adjusting-screws by which their position is determined.

Proceeding now to describe the mechanism by which the wire is severed into blanks, it consists, essentially, of the movable cutter $e$ and the fixed cutting-block $p$, Figs. 5 and 6, and the wire-supporting block $o$. The fixed cutting-block $p$ is attached to the frame of the machine by means of a set-screw, $a'''$, passing through a stirrup, $b''$, the lower ends of which are secured in the frame. The stirrup also incloses the fixed gripper $s$, which is held down in a groove formed for it in the frame by the pressure of the set-screw $a'''$, transmitted through the cutting-block $p$ and the adjusting-wedge $u$, which is introduced between the two. Above the cutting-block is placed the wedge $v$. Provision is made for adjusting the cutting-block lengthwise by means of the adjusting-screw $x$, passing through a lug on the wedge $u$. A set-screw, $z'$, passing laterally through the stirrup, bears against a block, $c'$, Fig. 23, which transmits its pressure to the cutting-block and the wedge and assists in holding them in place. The wedge $u$ may be adjusted lengthwise by the set-screw $w'$, inserted in a lug on the frame. Another set-screw, $w''$, serves to adjust the gripper $s$, and a wedge, $t'$, inserted below the gripper in the groove in the frame, is arranged so that the gripper itself may be adjusted up and down by means of the set-screw $w'''$. The arrangement of these parts will be readily understood from an examination of Fig. 6 and the sectional view, Fig. 23.

As will be observed from Fig. 30, the end of the cutting-block is beveled, as indicated at $a''''$, so as to allow clearance between the wire and the cutting-block when the wire-support $o$ travels upward. When the support $o$ moves downward, the wire is clamped and held firmly, so as to prevent twisting, between the cutting-block and the support. The cutter $e$ is secured in the reciprocating arm I by means of the devices shown in Fig. 6 and in section in Fig. 24. The cutter $e$, the form of which is shown in Figs. 25 and 26, is pressed down by the set-screw $f''''$ in the stirrup $b'''$, bearing on the block $g''$, the lower side of which may be made of a form corresponding with that of the cutter. The cutter rests on the gripper or gripping-die $s'$.

Provision is made for the lateral adjustment of the cutter $e$ by means of the wedge $o'$, which is arranged to be forced inward by the set-screw $o''$, Fig. 1, passing through a lug on the arm I. At the side of the gripper the wedge $h'$, Fig. 24, is placed, which is forced downward by the set-screw $n'$, acting through the block $q'$.

The arm I is pivoted at $q''$, Figs. 6 and 7, on centers inserted in the frame of the machine. As already mentioned, the outer end of the arm I receives an up-and-down motion from the lever G, Fig. 3, through the ball-connection H. The end of lever G is provided with the roller $q'''$, Fig. 31, which bears on the cam $d$ on the shaft B, and receives motion therefrom. The inner end of the lever G is pivoted on the center $r''$ on the frame of the machine. As indicated in the side view, Fig. 3, the lever G is bent downward, so as to permit the insertion of the ball-connection H between the lever and the end of the reciprocating cutter-carrying arm I. Suitable sockets are formed in both the lever and the arm, to receive the spherical enlargements at the ends of the connection H, the balls being held in place in the sockets by suitable caps. Any suitable form of universal joint may be substituted for the ball-connection H. The form of the arm I is such that the edge of the cutter $e$ passes slightly below that of the cutter-block $p$ as the arm reciprocates, thereby preventing the edges from injuring each other by contact. The arm is pivoted at $q''$, Fig. 6, a short distance to the right hand of the vertical plane passing through the edge of the cutter $e$, so that the cutter, as it reciprocates, describes a path which is slightly curved downward. As indicated in Fig. 6 also, the cutter and cutting-block occupy positions at an angle with the horizontal line. The cutter $e$ is shown on an enlarged scale in Figs. 25 and 26. The upper surface of the cutter and the lower surface of the cutting-block are formed of a shape adapted to sever the wire on diagonal lines, substantially as indicated in Fig. 9, so as to produce a blank like that represented in Figs. 11 and 12, when round wire is used, or like Fig. 13, when flat or compressed wire (represented in section in Fig. 10) is employed. The shape of the cutting-block $p$ is represented on a larger scale in Figs. 28 and 29. The lower end of the wire-supporting block is provided with a shoulder, so that it bears both against the side and top of the wire, and holds the wire against the cutting-block. The cam $n$, which operates the lever N which carries the supporting-block $o$, is so located relatively to the cam $d$, which moves the cutter $e$, that the supporting-block descends and forces the wire into position to be cut just before the cutter comes in contact with the wire. The wire-guide $r$ is set so as to draw the wire firmly in contact with the shoulder on the supporting-block $o$.

The supporting-block may be adjusted in position in the lever by means of the screw $u'$. The blanks are severed from the wire by the motion of the cutter, acting against the cutting-block, the face of which is beveled, as indicated at $a''''$ in Fig. 28. The return movement of the arm I and the cutter is secured by the spring Q and rod $k''$, Figs. 3 and 7, or the spring Q' and rod $k'''$, Fig. 3. It will be observed, from an inspection of Fig. 31, which shows the cam which operates the arm I, carrying the cutter $e$ and the gripper $s'$, that the arm receives a double movement—that is, supposing the grippers to be open, or separated to the greatest extent, the first inward movement of the cutter $e$ severs the blank. The motion is then arrested, while the blank is carried downward between the grippers. The grippers are then closed up on the shank of the blank while the heading-die is acting, at which time the edge of the cutter $e$ travels under the cutting-block a short distance, after which the grippers open and the cutter recedes from the cutting-block sufficiently to permit the feeding mechanism to feed the wire the distance requisite for the formation of the next blank.

The blank-carrying mechanism, by which the blank is conveyed from the cutting devices to the grippers $s$ $s'$, is shown in detail in Figs. 14 to 18, inclusive. It consists, essentially, of the carrying-fingers $i'$ $j'$ and mechanism adapted to give them the requisite movements, so that they open to seize the head of the blank before it is severed from the wire and convey it downward between the grippers, by which the shank of the blank is held while the head is formed by the head-forming die F. The grippers have grooves formed on their opposing faces adapted to give the required form to the shank of the nail. The blank-carrying fingers $i'$ $j'$ receive an up-and-down movement from the cam $f''$ on the shaft B by means of the lever R, which is provided with a central bar, S, pivoted at $z'$ $z''$, Figs. 4 and 21, below the centers $m$ $m'$ of the lever N. The shape of the lever R is such that while it is pivoted below the bar O of the lever N it reaches upward and around its inner end, so as to support the blank-carriers in the proper position relative to the cutter and the grippers. At its outer end the lever R carries the roller $t''$, Figs. 1, 15, and 17, which receives the motion from the cam $f''$ requisite to carry the blank from the cutter to the grippers, while the movement of the finger $j'$, which bends over the head of the blank, as described in my former patent, is imparted to the lever by the cam $f'$, acting on the adjustable friction-piece $u''$.

The amount of bending given to the head of the blank after it has been transferred to and seized by the grippers may be regulated by adjusting the friction-piece $u''$ by means of the adjusting-screw $v''$. The friction-piece $u''$ consists, preferably, of a piece of spring-steel attached to the lever R at one end and bearing on the point of the adjusting-screw $v''$ at its other end, its lower surface being provided with a lug or projection against which the cam $f'$ strikes. The finger $j'$ is not attached rigidly to the end of the lever R, but it is inserted in a swinging block T, pivoted to the lever at $w''''$, Figs. 14 and 16, so that the lower end of the finger can swing laterally, as indicated by the full and dotted lines in Fig.

16, while the blank is being severed from the wire. A spring, $x''$, Fig. 17, attached to the lever R serves to return the block T to its position against the set-screw $y''$, Fig. 14. The finger $j'$ is held in place in the pivoted block T by a set-screw, and arranged to be adjusted by the adjusting-screw $h'''$, Fig. 14. The finger $i'$ is inserted in a holder, $c'''$, Figs. 17 and 18, which is arranged to slide up and down in the pivoted block $d'''$ on the stem $e'''$, provided with the spring $f'''$. The stem $e'''$ is square, so as to prevent the finger from turning, and it is provided at its upper end with a nut or projection against which the spring $f'''$ bears. The block $d'''$ is pivoted to the block T at $j'''$, so that it can swing outward, carrying the finger $i'$ with it. It will thus be seen that by the construction described the finger $i'$ has a motion up and down with the lever R, and an independent motion up and down derived from the spring $f'''$, and a lateral swinging movement derived from the rock-shaft $f$, Figs. 1 and 14, through the link $k'''$. The upward movement of the finger $i'$ is arrested at a certain point by the stop $i'''$, Figs. 7 and 18, so that as the other finger continues to move upward the two are separated sufficiently to permit the entrance of the end of the wire between them. The finger $j'$ then descends and the end of the wire is seized between its lower end and the extremity of the finger $i'$, the pressure requisite to hold the blank in place being obtained by a slight compression of the spring $f'''$. The fingers are allowed to remain stationary, or without any movement vertically, although permitted to swing laterally, during the cutting operation, this action taking place while the roller $t''$, Fig. 19, is in contact with the cylindrical portion of the shaft B, which may be slightly flattened, if necessary, to produce this result. The fingers then descend together, under the action of the cam $f''$, carrying the blank with them until it is placed between the grippers $s\ s'$, which close up on it and hold it between them during the action of the heading-die. As soon as the blank is placed between the grippers the finger $j'$ is forced downward slightly by the cam $f'$ acting on the friction-piece $u''$, so as to give the head of the nail the requisite bend relative to the shank, in order to secure the proper distribution of the metal in the head of the nail, as described in my previous patent. After the head of the blank has been bent over, the finger $j'$ moves upward, and the finger $i'$ is moved sidewise by the rock-shaft $f$ and link $k'''$, so as to clear itself from the blank and to leave the latter exposed to the action of the heading-die. During the operation of severing the blank from the wire the fingers $i'$ and $j'$ are permitted to swing together toward the left hand in Fig. 14. The return movement of the finger $i'$, after it has been swung outward by the shaft $f$, is effected by the spring $m'''$, Figs. 16 and 17, attached to the block T at its upper end and bearing at its lower end against a pin or lug inserted in the pivoted block $d'''$. The rock-shaft $f$ is provided with an arm, $p'''$, Fig. 14, which comes in contact with a cam on the side of the crank-disk J (represented by dotted lines $o''''$, Fig. 1) in such position as to move the finger $i'$ laterally when the blank has been inserted in the grippers, as indicated by the full and dotted lines in Fig. 14. The link $k'''$ forms a connection between an arm on the rock-shaft $f$ and the holder $c'''$, being pivoted to the latter at $q''''$, Fig. 18. The cam $o''''$ is placed in a groove in the side of the crank-disk. The stop $i'''$ is attached to any suitable part of the machine—as, for instance, to the stirrup $b''$, Fig. 23, which passes over the cutting-block—the function of the stop being to arrest the upward movement of the holder $c'''$ and finger $i'$, so as to permit the wire to be fed in between the fingers by the feeding mechanism. The stop is bent over to form a shoulder at its upper end, its bent portion coming in contact with a lug or projection on the holder $c'''$. Provision is made for adjusting the stop $i'''$ in its vertical position, so as to cause the requisite separation between the blank-carrying fingers.

It remains to describe the mechanism by which the heading-die F is operated to produce a double action on the head of the blank to form the finished nail. A crank-pin, $r'''$, inserted in the disk J, imparts a reciprocating motion to the connection K, which causes the pivoted lever L to vibrate, and by means of the connection U gives the heading-die F a to-and-fro movement relative to the grippers at the proper time to compress the head of the blank. The connection K is attached to the crank-pin $r'''$ by means of the box $s'''$ and key W, so that the connection may be readily detached from the crank and its end dropped down into the position indicated by the dotted lines in Fig. 2, to afford access to the cutting or gripping devices, when desired. The connection K is attached to the outer end of the lever L by a ball or spherical joint, as shown at X, Figs. 1 and 2. The lever L is pivoted to the frame of the machine at V, Fig. 1, in any suitable manner. The inner arm of the lever is pivoted to the connection U at Y, Fig. 1. The inner end of connection U is pivoted at Z to a block or cross-head, R', which slides in suitable ways on the frame A, and carries the heading-die F. The heading-die is attached to the cross-head by a set-screw passing through a stirrup, and provision is made for adjusting it by a wedge underneath it, and by wedge-blocks on each side of it, in a manner substantially similar to that described in my previous patent. From an inspection of Fig. 1 it will be perceived that the pivotal point Y, between the inner end of the angular lever L and the connection U, passes beyond the line joining the centers U and Z, as indicated by the dotted lines, so that on the return movement of the lever the heading-die is again forced inward slightly, thereby producing a better finish on the head of the nail. The heading-die is arranged to be adjusted relatively to the grippers by the screw $t'''$, Figs. 1 and 4.

The finished nail is discharged from the machine by a clearer, S', Fig. 7, operated from the cam $d'$, Fig. 1, on the shaft B, through the lever M, which is attached to a rock-shaft, T', Figs. 4 and 7, to which the clearer is connected. The clearer has a vibrating movement between the grippers at the time they are opened, so as to force the nails out from between them and to deliver them to a suitable receptacle placed below the machine.

The heads of the nails produced by my improved machine may be given any preferred form by the heading-die, as represented at 1, 2, and 3, Fig. 19. The form of nail represented at 4, Fig. 19, may be made by setting over the head of the blank by means of the cam $f'$, and by using a suitable shaped heading-die.

I claim—

1. The combination, with the cutting-block $p$, of the cutter $e$, grippers $s\ s'$, and suitable operating mechanism adapted to impart a double reciprocation to the cutter and one of the grippers at each revolution of the shaft of the said mechanism, substantially as described.

2. The combination, with the cutting-block $p$, wedge $u$, and gripper $s$, of the reciprocating cutter $e$ and gripper $s'$, substantially as described.

3. The combination, with the cutting-block $p$, wedge $u$, and gripper $s$, of the reciprocating cutter $e$, gripper $s'$, and reciprocating shouldered wire-support $o$, substantially as described.

4. The combination, with the cutting-block $p$, gripper $s$, and reciprocating cutter $e$ and gripper $s'$, of the pivoted blank-carrying fingers $i'\ j'$, adapted to convey the blank from the cutter to the grippers and arranged to move laterally during the cutting operation, substantially as described.

5. The combination, with the cutting-block $p$, of the reciprocating cutter $e$, pivoted arm I, universal connection H, lever G, and cam $d$, substantially as described.

6. The combination, with the cutting-block $p$, of the reciprocating cutter $e$, pivoted arm I, universal connection H, lever G, shaft B, reciprocating wire-support $o$, lever N, and cam $n$, substantially as described.

7. The combination, with the shaft B, of the cutting-block $p$, reciprocating cutter $e$, and reciprocating wire-support $o$, and suitable intermediate mechanism adapted to impart the requisite movements to the cutter and support, substantially as described.

8. The combination, with the shaft B, of the cutting-block $p$ and gripper $s$, the reciprocating wire-support $o$, cutter $e$, and gripper $s'$, blank-carriers $i'\ j'$, cams $n$, $f''$, and $d$, and suitable levers, whereby the cutting, holding, and blank-carrying mechanism are actuated from a single shaft, substantially as described.

9. The combination, with suitable mechanism constructed and arranged to form nail-blanks from wire by severing it on diagonal lines, and to transfer the blanks from the cutter to the grippers, of the reciprocating heading-die F, arranged to produce a double action on the head of the blank while held in the grippers, substantially as described.

10. The combination, with the gripper $s$, of the movable gripper $s'$, pivoted arm I, lever G, cam $d$, and shaft B, the crank $r'''$, connection K, lever L, connection U, and reciprocating heading-die F, substantially as described.

11. The herein-described blank-carrying mechanism for nail-machines, consisting of the lever R, arranged to be operated by the cam $f''$ on shaft B, fingers $i'\ j'$, attached to suitable supporting-block pivoted to the said lever, and rock-shaft $f$, connection K''', and cam $o''''$, by which the finger $i'$ is moved laterally to permit the return movement of the fingers, substantially as described.

12. The combination, with the blank-carrying fingers $i'\ j'$ of a wire-nail machine, of the fixed stop $i'''$, adapted to arrest the upward movement of the finger $i'$, to permit the feeding of the wire, substantially as described.

13. The combination, with the lever R, of the blank-carrying fingers $i'\ j'$, pivoted blocks T and $d'''$, holder $c'''$, stem $e'''$, spring $f'''$, and stop $i'''$, substantially as described.

14. The combination, with the lever R, of the blank-carrying fingers $i'\ j'$, pivoted block $d'''$, adjustable stop $g'''$, and springs $m''''\ x''''$, substantially as described.

15. The combination, with the cutting-block $p$, adjustably secured in the frame A, of the reciprocating shouldered wire-support $o$, and the reciprocating cutter $e$, adjustably secured in the arm I, pivoted in such relation to the edge of the cutting-block that the edge of the cutter can reciprocate without contact with the cutting-block, substantially as described.

16. The combination, with the cutting-block secured in the frame of the machine, of the reciprocating cutter $e$, and lever N, carrying the reciprocating shouldered wire-support $o$, wire-guide $r$, and jaws $l\ l'$, substantially as described.

17. The combination, with the frame A of a wire-nail machine having a single driving-shaft, B, and a cutting-block, $p$, and gripper $s$, affixed to the frame, of the reciprocating cutter $e$, and gripper $s'$, arranged to be operated by suitable levers in a plane parallel with the shaft, suitable blank-carrying mechanism, and the reciprocating heading-die F, arranged to be operated in a plane at right angles with the shaft by connection K and lever L, substantially as described.

LOUIS J. HIRT.

Witnesses:
LEWIS M. LOSS,
GEO. B. SELDEN.